United States Patent
Kim et al.

(10) Patent No.: US 10,754,023 B2
(45) Date of Patent: Aug. 25, 2020

(54) METHOD AND APPARATUS FOR DETECTING OBJECT USING RADAR OF VEHICLE

(71) Applicant: Samsung Electronics Co., Ltd., Suwon-si (KR)

(72) Inventors: Donghan Kim, Seoul (KR); Jaesup Lee, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 117 days.

(21) Appl. No.: 15/877,967

(22) Filed: Jan. 23, 2018

(65) Prior Publication Data

US 2019/0064340 A1 Feb. 28, 2019

(30) Foreign Application Priority Data

Aug. 28, 2017 (KR) .................. 10-2017-0108572

(51) Int. Cl.
*G01S 13/58* (2006.01)
*G01S 7/02* (2006.01)
(Continued)

(52) U.S. Cl.
CPC .............. *G01S 13/58* (2013.01); *G01S 7/023* (2013.01); *G01S 13/325* (2013.01); *G01S 13/93* (2013.01); *G01S 13/931* (2013.01); *G01S 7/354* (2013.01)

(58) Field of Classification Search
CPC ...... G01S 13/931; G01S 13/325; G01S 13/58; G01S 13/93; G01S 7/023; G01S 7/354;
(Continued)

(56) References Cited

U.S. PATENT DOCUMENTS 6,930,631 B2 8/2005 Puglia
7,760,133 B2 7/2010 Shirai et al.
(Continued)

FOREIGN PATENT DOCUMENTS

EP 2 735 885 A1 5/2014
JP 2002-107447 A 4/2002
(Continued)

OTHER PUBLICATIONS

Extended European Search Report dated Jan. 16, 2019 in counterpart European Patent Application No. 18179369.6 (14 pages in English).

*Primary Examiner* — Timothy X Pham
(74) *Attorney, Agent, or Firm* — NSIP Law

(57) ABSTRACT

A method performed by an apparatus included in a vehicle to detect an object using a radar includes: propagating, in a normal mode period of an operating period for detecting objects, a normal mode transmission signal generated based on a default code sequence including at least two codes; receiving a normal mode reception signal in the normal mode period; detecting, in the normal mode period, an object based on the default code sequence and the normal mode reception signal; receiving a listening mode reception signal in a listening mode period of the operating period; acquiring a correlation between the listening mode reception signal and the default code sequence; and changing the default code sequence based on the correlation.

19 Claims, 12 Drawing Sheets

(51) Int. Cl.
*G01S 13/32* (2006.01)
*G01S 13/931* (2020.01)
*G01S 13/93* (2020.01)
*G01S 7/35* (2006.01)

(58) Field of Classification Search
CPC ... G01S 13/32; B60W 2420/52; G05D 1/0257
See application file for complete search history.

(56) References Cited

U.S. PATENT DOCUMENTS

| | | |
|---|---|---|
| 9,182,476 B2 | 11/2015 | Wintermantel |
| 2002/0027522 A1 | 3/2002 | Tullsson |
| 2004/0070532 A1 | 4/2004 | Ishii et al. |
| 2008/0036645 A1 | 2/2008 | Yamano et al. |
| 2009/0135053 A1* | 5/2009 | Negoro ............... H04B 1/707 342/195 |
| 2013/0342383 A1 | 12/2013 | Kojima |
| 2016/0223644 A1 | 8/2016 | Soga |
| 2016/0238694 A1 | 8/2016 | Kishigami et al. |
| 2017/0086202 A1 | 3/2017 | Chen |
| 2017/0097684 A1 | 4/2017 | Lien |
| 2017/0102458 A1 | 4/2017 | Schuman et al. |

FOREIGN PATENT DOCUMENTS

| | | |
|---|---|---|
| JP | 2002-328160 A | 11/2002 |
| JP | 2008-76290 A | 4/2008 |
| JP | 2010-181182 A | 8/2010 |

\* cited by examiner

300

METHOD AND APPARATUS FOR DETECTING OBJECT USING RADAR OF VEHICLE

CROSS-REFERENCE TO RELATED APPLICATIONS

This application claims the benefit under 35 USC § 119(a) of Korean Patent Application No. 10-2017-0108572, filed on Aug. 28, 2017, in the Korean Intellectual Property Office, the entire disclosure of which is incorporated herein by reference for all purposes.

BACKGROUND

1. Field

The following description relates to a method and apparatus for detecting an object, and more particularly, to a method and apparatus for detecting an object using a radar of a vehicle.

2. Description of Related Art

Advanced driver-assistance systems (ADAS) are assistance systems to support driving for the purpose of avoiding a dangerous situation and to enhance a safety and convenience of a driver using sensors located inside or outside a vehicle. Domestic and foreign travel regulations are being strengthened and preparations for commercialization of autonomous vehicles are being made, and, accordingly, the importance of related industries is increasing.

Sensors used in an ADAS include, for example, a camera, an infrared ray sensor, an ultrasonic sensor, a lidar and a radar. The radar has an advantage of being capable of stably measuring an object in a vicinity of a vehicle regardless of a surrounding environment such as the weather, in comparison to an optical-based sensor. Thus, the radar is important in constructing an ADAS.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a method performed by an apparatus included in a vehicle to detect an object using a radar includes: propagating, in a normal mode period of an operating period for detecting objects, a normal mode transmission signal generated based on a default code sequence including at least two codes; receiving a normal mode reception signal in the normal mode period; detecting, in the normal mode period, an object based on the default code sequence and the normal mode reception signal; receiving a listening mode reception signal in a listening mode period of the operating period; acquiring a correlation between the listening mode reception signal and the default code sequence; and changing the default code sequence based on the correlation.

The normal mode transmission signal may include a phase modulated continuous wave (PMCW) signal.

The default code sequence may be determined in advance based on either one or both of an autocorrelation and a cross-correlation.

The detecting of the object may include generating a normal mode digital signal by converting the normal mode reception signal into a digital signal.

The detecting of the object may further include generating cumulative signals by accumulating the normal mode digital signal for each of chip durations of the default code sequence, and detecting the object based on a correlation between the default code sequence and each of the cumulative signals.

The detecting of the object based on the correlation between the default code sequence and each of the cumulative signals may include calculating the correlation between the default code sequence and each of the cumulative signals, and detecting the object by detecting a valid signal among the cumulative signals based on the calculated correlation.

The detecting of the object based on the correlation between the default code sequence and each of the cumulative signals may further include calculating a distance between the vehicle and the object based on a delay time of the valid signal.

The detecting of the object based on the correlation between the default code sequence and each of the cumulative signals may further include calculating a speed of the object based on distances between the vehicle and the object calculated for intervals in the normal mode period.

The changing of the default code sequence may include determining the listening mode reception signal to be an interference signal based on a correlation between the default code sequence and the listening mode reception signal, and changing the default code sequence in response to the listening mode reception signal being determined to be the interference signal.

The changing of the default code sequence may further include generating a random number, and determining a target code sequence among candidate code sequences based on the random number, and the changing of the default code sequence in response to the listening mode reception signal being determined to be the interference signal may include setting the target code sequence as the default code sequence.

In another general aspect, a non-transitory computer-readable storage medium stores instructions that, when executed by a processor, cause the processor to perform the method described above.

In another general aspect, an apparatus to detect an object using a radar includes: a processor configured to execute a program to propagate, in a normal mode period of an operating period for detecting objects, a normal mode transmission signal generated based on a default code sequence including at least two codes, receive a normal mode reception signal in the normal mode period, detect, in the normal mode period, an object based on the default code sequence and the normal mode reception signal, receive a listening mode reception signal in a listening mode period of the operating period, acquire a correlation between the listening mode reception signal and the default code sequence, and change the default code sequence based on the correlation.

The apparatus may further include a memory configured to store the instructions.

The apparatus may be installed in a vehicle.

The vehicle may be any one of an autonomous vehicle, an automobile, an electric vehicle, a truck, a motorcycle, a boat, a public transit vehicle, a bus, a monorail, a train, and an unmanned aerial vehicle.

In another general aspect, a method performed by an apparatus included in a vehicle to detect an object using a radar includes: propagating, in a main mode period, a main mode transmission signal generated based on a default code sequence; receiving a main mode reception signal in the main mode period; detecting, in the main mode period, an object based on the default code sequence and the main mode reception signal; determining, in the main mode period, whether an interference signal is present based on a preliminary code sequence and the main mode reception signal; and propagating an alternative mode transmission signal in an alternative mode period next to the main mode period, based on whether the interference signal is determined to be present, wherein the main mode transmission signal and the alternative mode transmission signal are each generated based on at least two codes, and the alternative mode transmission signal is used to detect an object.

The propagating of the alternative mode transmission signal may include generating the alternative mode transmission signal based on the preliminary code sequence, in response to the interference signal not being determined to be present.

The propagating of the alternative mode transmission signal may include changing the preliminary code sequence and generating the alternative mode transmission signal based on the changed preliminary code sequence, in response to the interference signal being determined to be present.

The propagating of the alternative mode transmission signal may further include generating a random number and determining a target code sequence among candidate code sequences based on the random number, in response to the interference signal being determined to be present. The changing of the preliminary code sequence may include setting the target code sequence as the preliminary code sequence.

The method may further include: receiving an alternative mode reception signal in the alternative mode period; detecting an object based on the preliminary code sequence and the alternative mode reception signal in the alternative mode period; and determining that the interference signal is present based on the default code sequence and the alternative mode reception signal in the alternative mode period.

The main mode transmission signal may include a phase modulated continuous wave (PMCW) signal.

The default code sequence may be determined in advance based on either one or both of an autocorrelation and a cross-correlation.

The detecting of the object may include generating a main mode digital signal by converting the main mode reception signal into a digital signal.

The detecting of the object may further include generating cumulative signals by accumulating the main mode digital signal for each of chip durations of the default code sequence, and detecting the object based on a correlation between the default code sequence and each of the cumulative signals.

The detecting of the object based on the correlation between the default code sequence and each of the cumulative signals may include calculating the correlation between the default code sequence and each of the cumulative signals, and detecting the object by detecting a valid signal among the cumulative signals based on the calculated correlation.

In another general aspect, a non-transitory computer-readable storage medium stores instructions that, when executed by a processor, cause the processor to perform the method described above.

In another general aspect, apparatus to detect an object using a radar includes: a processor configured to execute a program to propagate, in a main mode period, a main mode transmission signal generated based on a default code sequence, receive a main mode reception signal in the main mode period, detect, in the main mode period, an object based on the default code sequence and the main mode reception signal, determine, in the main mode period, whether an interference signal is present based on a preliminary code sequence and the main mode reception signal, and propagate an alternative mode transmission signal in an alternative mode period next to the main mode period, based on whether the interference signal is determined to be present, wherein the main mode transmission signal and the alternative mode transmission signal are each generated based on at least two codes, and the alternative mode transmission signal is used to detect an object.

The apparatus may further include a memory configured to store the instructions.

The apparatus may be installed in a vehicle.

The vehicle may be any one of an autonomous vehicle, an automobile, an electric vehicle, a truck, a motorcycle, a boat, a public transit vehicle, a bus, a monorail, a train, and an unmanned aerial vehicle.

The processor may be further configured execute the program to propagate the alternative mode transmission signal by changing the preliminary code sequence and generating the alternative mode transmission signal based on the changed preliminary code sequence, in response to the interference signal being determined to be present.

Other features and aspects will be apparent from the following detailed description, the drawings, and the claims.

Figure 1:
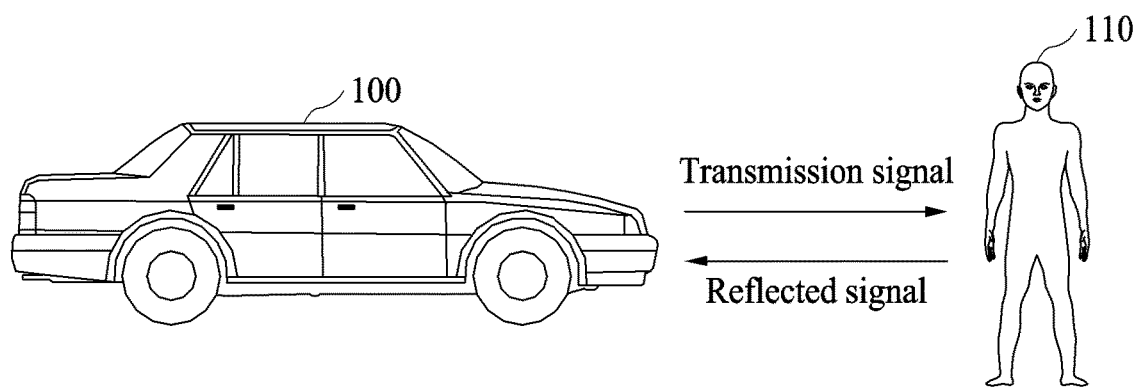
FIG. 1 is a diagram illustrating an example of a method of detecting an object in a vehicle.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

The terminology used herein is for the purpose of describing particular examples only and is not intended to be limiting of the present inventive concept. As used herein, the singular forms "a," "an" and "the" are intended to include the plural forms as well, unless the context clearly indicates otherwise. It will be further understood that the terms "include" and/or "have," when used in this specification, specify the presence of stated features, integers, steps, operations, elements, components or combinations thereof, but do not preclude the presence or addition of one or more other features, integers, steps, operations, elements, components, and/or groups thereof.

Unless otherwise defined, all terms including technical and scientific terms used herein have the same meaning as commonly understood by one of ordinary skill in the art to which these examples belong. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

In the description of examples, detailed description of well-known related structures or functions will be omitted when it is deemed that such description could cause ambiguous interpretation of the present disclosure.

FIG. 1 illustrates an example of a method of detecting an object 110 in a vicinity of a vehicle 100.

Referring to FIG. 1, a method of propagating a signal around the vehicle 100 and detecting a signal reflected by the object 110 is used as a method of detecting the object 110 in the vicinity of the vehicle 100. For example, a radar of the vehicle 100 propagates a signal around the vehicle 100 to detect objects such as the object 110, calculates a time of flight (ToF) from the signal reflected by the object 110, and calculates a distance between the vehicle 100 and the object 110. The vehicle 100 may be any mode of transportation, such as, for example, an autonomous vehicle, an automobile, an electric vehicle, a truck, a motorcycle, a boat, a public transit vehicle, a bus, a monorail, a train, or an unmanned aerial vehicle (drone).

To distinguish the signal reflected by the object 110 from other signals such as noise, the radar propagates a modulated signal around the vehicle 100. In an example, the modulated signal is a frequency-modulated continuous wave (FMCW) signal. The FMCW signal is, for example, a signal having a frequency modulated based on 77 gigahertz (GHz). When a millimeter wave in a band of 77 GHz is used, a relatively high resolution is provided. In another example, the modulated signal is a phase-modulated continuous wave (PMCW) signal. The PMCW signal is, for example, a signal having a phase modulated based on 77 GHz. A code sequence is used to generate a PMCW signal. The code sequence includes continuous signals of codes. For example, the code sequence includes two codes, for example, binary codes such as a code representing "0" and a code representing "1," or includes two codes, for example, a code representing a low value and a code representing a high value.

Figure 2:
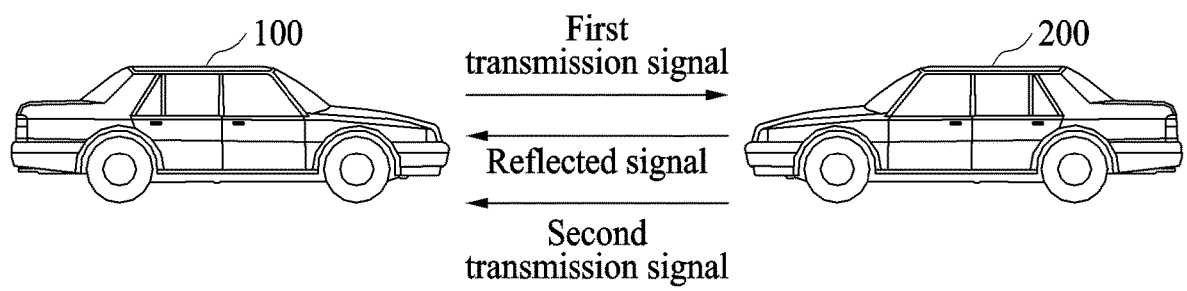
FIG. 2 is a diagram illustrating an example of an interference signal generated by another vehicle.

FIG. 2 illustrates an example of an interference signal generated by another vehicle 200.

A code sequence is determined based on an autocorrelation characteristic and a cross-correlation characteristic. The determined code sequence has a low correlation value for a non-zero delay, and has a high correlation value for a zero delay. Also, the determined code sequence has a low correlation with another code sequence.

For example, when a code sequence has "512" chips, a number of code sequences that satisfy both the autocorrelation characteristic and the cross-correlation characteristic is limited. Because code sequences used to generate a PMCW signal are limited, the same code sequence is used by a portion of vehicles to generate a PMCW signal.

For example, referring to FIG. 2, the vehicle 100 and the other vehicle 200 use the same code sequence to detect an object. When the same code sequence is used by the vehicle 100 and the other vehicle 200, a first transmission signal propagated by the vehicle 100 is the same as a second transmission signal propagated by the other vehicle 200.

The vehicle 100 receives, from the other vehicle 200, the second transmission signal, and a signal that is reflected from the other vehicle 200 by transmitting the first transmission signal to the other vehicle 200. The reflected signal is a signal reflected from an object, and accordingly the vehicle 100 calculates an accurate distance to the object. However, because the second transmission signal is propagated directly from the other vehicle 200, information about the object detected by the vehicle 100 has an error. When the information with the error is acquired, an operation of the vehicle 100 is obstructed.

When the other vehicle 200 in the vicinity of the vehicle 100 uses the same code sequence as that of the vehicle 100, it is possible to avoid a situation in which the second transmission signal propagated by the other vehicle 200 causes an error in information about an object detected by the vehicle 100, by changing the code sequence used by the vehicle 100. Hereinafter, an example of a method of detecting an object by changing a code sequence will be described in detail with reference to FIGS. 3 through 15.

Figure 3:
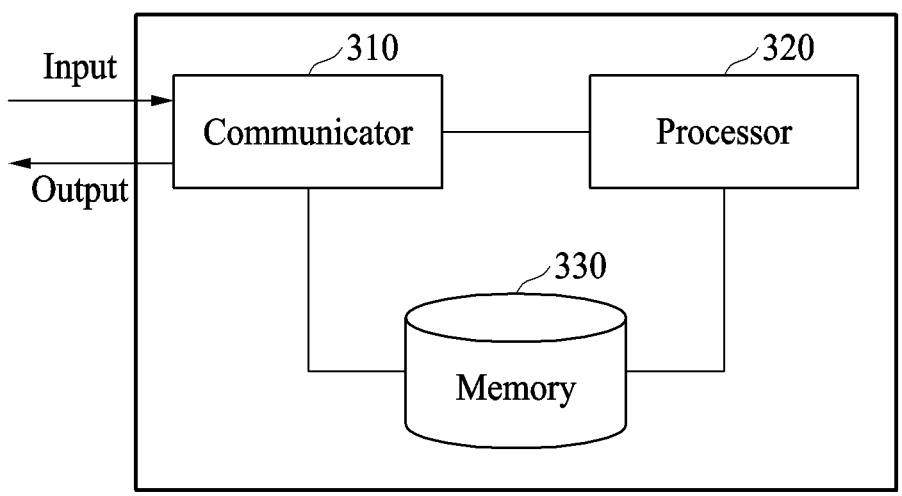
FIG. 3 is a diagram illustrating an example of an object detection apparatus.

FIG. 3 illustrates an example of an object detection apparatus 300.

Referring to FIG. 3, the object detection apparatus 300 includes, for example, a communicator 310, a processor 320 and a memory 330. The object detection apparatus 300 is included in the vehicle 100 of FIGS. 1 and 2. In an example, the object detection apparatus 300 is an electronic control unit (ECU) of the vehicle 100. In another example, the object detection apparatus 300 is connected to the ECU of the vehicle 100.

The communicator 310 is connected to the processor 320 and the memory 330, and is configured to transmit data to the processor 320 and the memory 330, and receive data from the processor 320 and the memory 330. Also, the communicator 310 is connected to an external device and is configured transmit data to the external device, and receive data from the external device.

The communicator 310 is implemented as, for example, a circuitry in the object detection apparatus 300. In an example, the communicator 310 includes an internal bus and an external bus. In another example, the communicator 310 is an element configured to connect the object detection apparatus 300 to an external device. The communicator 310 is, for example, an interface. The communicator 310 receives data from the external device and transmits data to the processor 320 and the memory 330.

The processor 320 processes data received by the communicator 310 and data stored in the memory 330. The term "processor," as used herein, may be a hardware-implemented data processing device having a circuit that is physically structured to execute desired operations. For example, the desired operations may include code or instructions included in a program. The hardware-implemented data processing device may include, but is not limited to, for example, any of a microprocessor, a central processing unit (CPU), a processor core, a multi-core processor, a multiprocessor, an application-specific integrated circuit (ASIC), and a field-programmable gate array (FPGA).

The processor 320 executes a computer-readable code (for example, software) stored in a memory (for example, the memory 330), and executes instructions included in the computer-readable code.

The memory 330 stores data received by the communicator 310 and data processed by the processor 320. For example, the memory 330 stores a program. The stored program may be coded to detect an object and may include a set of syntax which is executable by the processor 320.

The memory 330 includes, for example, any one or any combination of a volatile memory, a nonvolatile memory, a random access memory (RAM), a flash memory, a hard disk drive and an optical disc drive.

Also, the memory 330 stores an instruction set (for example, software) to operate the object detection apparatus 300. The instruction set to operate the object detection apparatus 300 is executed by the processor 320.

The communicator 310, the processor 320 and the memory 330 are further described below with reference to FIGS. 4 through 15.

Figure 4:
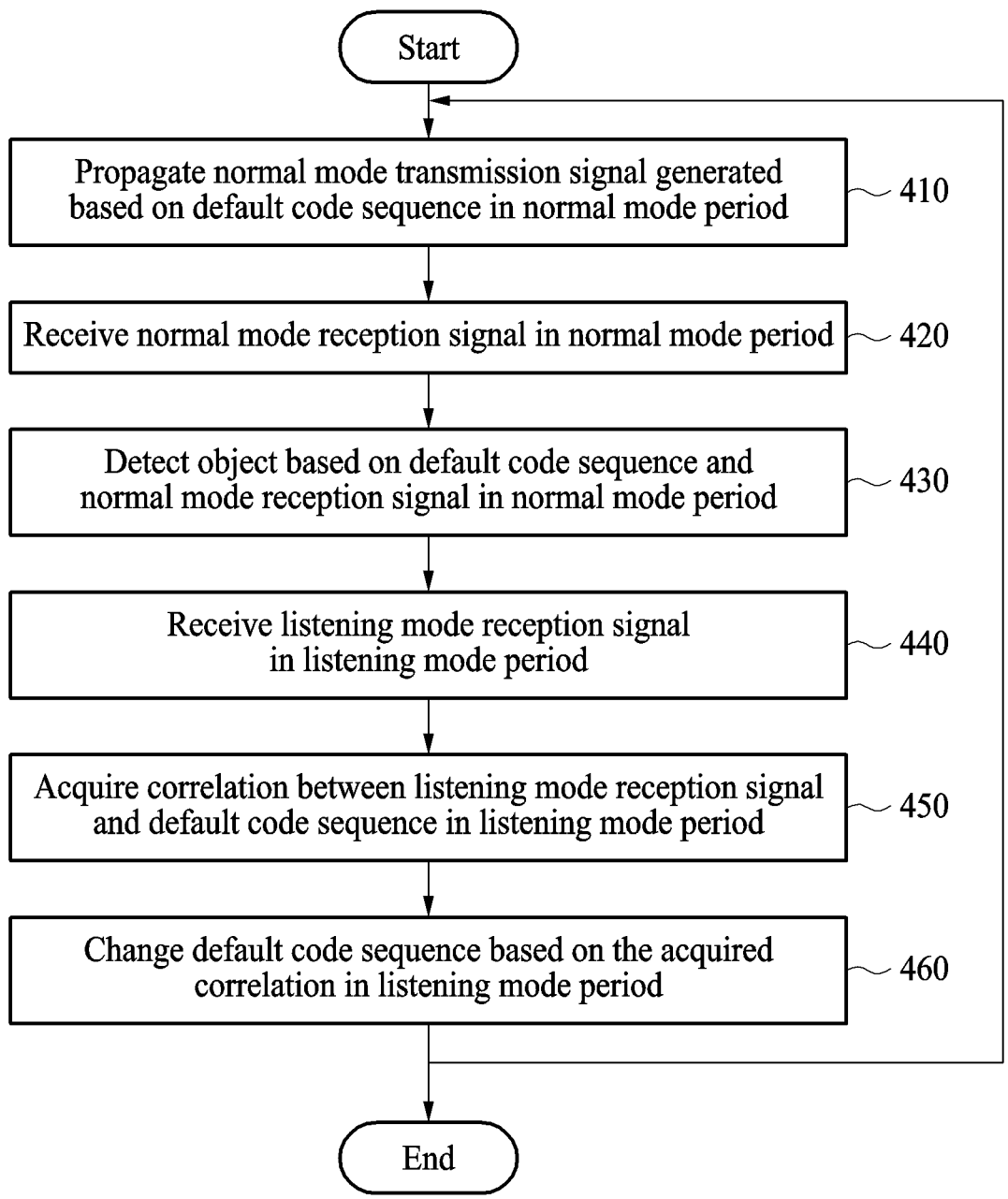
FIG. 4 is a flowchart illustrating an example of an object detection method.

FIG. 4 illustrates an example of an object detection method. Operations 410 through 460 of FIG. 4 are performed by the object detection apparatus 300 of FIG. 3.

Referring to FIG. 4, an operating period to detect an object includes a normal mode period and a listening mode period. Operations 410 through 430 are performed in the normal mode period, and operations 440 through 460 are performed in the listening mode period.

In operation 410, the communicator 310 propagates a normal mode transmission signal, which is generated based on a default code sequence, around the vehicle 100 in the normal mode period. For example, the communicator 310 uses a transmitter of a radar to propagate the normal mode transmission signal.

The default code sequence includes codes, and is determined in advance based on either one or both of an auto-correlation and a cross-correlation. The default code sequence corresponds to, for example, a digital signal.

The processor 320 generates the normal mode transmission signal based on the default code sequence, using a digital-to-analog converter (DAC). The normal mode transmission signal is, for example, a PMCW signal. The default code sequence and the normal mode transmission signal will be further described below with reference to FIG. 5.

In operation 420, the communicator 310 receives a normal mode reception signal in the normal mode period. In an example, when an object exists within a detection range of the radar, the normal mode reception signal includes a noise signal and a signal reflected by transmitting the normal mode transmission signal. In another example, when an object does not exist in the detection range of the radar, the normal mode reception signal includes a noise signal.

In operation 430, the processor 320 detects an object based on the default code sequence and the normal mode reception signal in the normal mode period. For example, the processor 320 acquires a correlation between the default code sequence and a normal mode digital signal that is generated based on the normal mode reception signal, and detects an object based on the acquired correlation. An example of detecting an object will be further described below with reference to FIGS. 6 through 9.

In operation 440, the communicator 310 receives a listening mode reception signal in the listening mode period. In the listening mode period, a transmission signal is not propagated from the vehicle 100, and an external signal is received.

In operation 450, the processor 320 acquires a correlation between the listening mode reception signal and the default code sequence in the listening mode period. For example, the processor 320 acquires a correlation between the default code sequence and a listening mode digital signal that is generated based on the listening mode reception signal. When the correlation between the default code sequence and the listening mode digital signal is high, a vehicle (for example, the vehicle 200 of FIG. 2) that uses the same default code sequence as that of the vehicle 100 is determined to be in the vicinity of the vehicle 100. The vehicle 100 determines a signal transmitted by the vehicle 200 to be an interference signal.

In operation 460, the processor 320 changes the default code sequence based on the correlation in the listening mode period to a default code sequence that is to be used in a next normal mode period. For example, a correlation between the changed default code sequence and the default code sequence that is used in operation 410 is low or zero. When the default code sequence is changed, an interference with the vehicle 100 by the vehicle 200 is cancelled. An example of changing a default code sequence will be further described below with reference to FIGS. 10 and 11.

When operation 460 is completed, operation 410 is re-performed. When an interference signal of the vehicle 200 is detected, a normal mode transmission signal generated based on the changed default code sequence is propagated. When the interference signal of the vehicle 200 is not detected, the original default code sequence is used without a change to generate a normal mode transmission signal.

Figure 5:
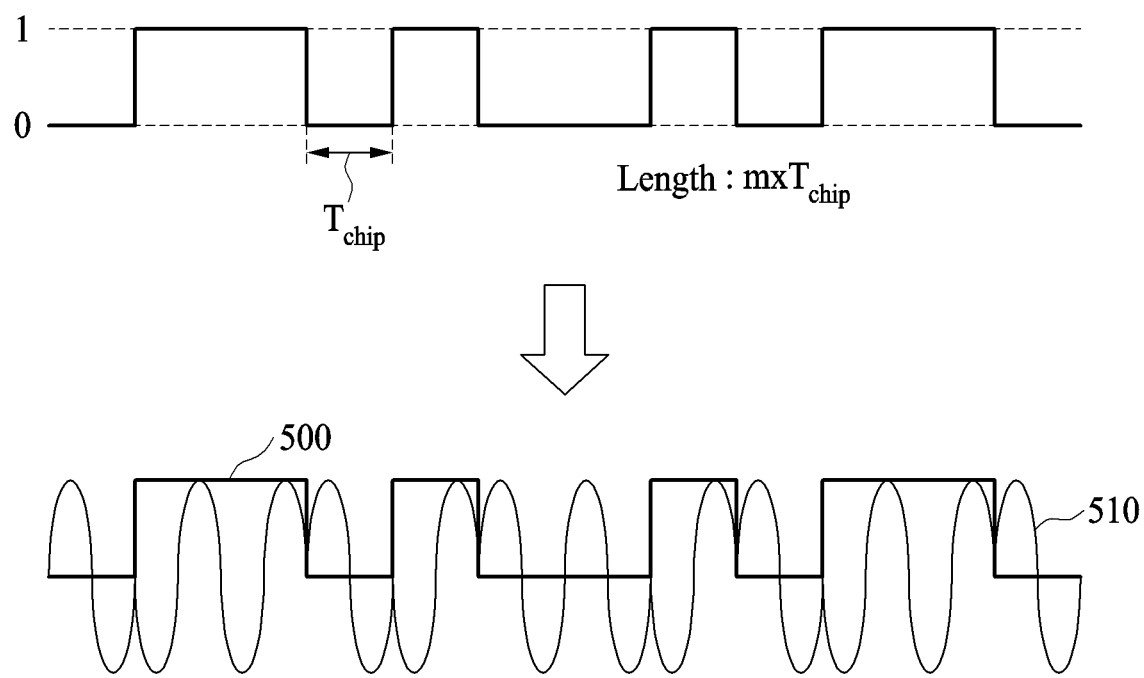
FIG. 5 is a diagram illustrating an example of a default code sequence and a transmission signal.

FIG. 5 illustrates an example of a default code sequence 500 and a transmission signal.

Referring to FIG. 5, the default code sequence 500 is generated in advance based on at least two codes. In an example, the at least two codes include a code representing "0" or a code representing "1". In another example, the at least two codes include a code representing a low value and a code representing a high value.

For a single chip duration $T_{chip}$, a single code is represented. The default code sequence 500 includes "m" codes. The default code sequence 500 has a length of "m×$T_{chip}$." For example, m is "512."

The default code sequence 500 is determined in advance based on an autocorrelation and a cross-correlation. For example, the default code sequence 500 has a low correlation for a non-zero delay, and has a high correlation for a zero delay. Also, the default code sequence 500 has a low correlation with another code sequence.

The object detection apparatus 300 generates a normal mode transmission signal 510 based on the default code sequence 500. For example, the object detection apparatus 300 generates the normal mode transmission signal 510 based on a continuous waveform corresponding to each code. A code representing "0" or a code representing a low value is in a form of a sine wave. A code representing "1" or a code representing a high value is in a form of a sine wave with a phase shift of 180 degrees. For example, a PMCW signal is generated as a normal mode transmission signal 510.

Figure 6:
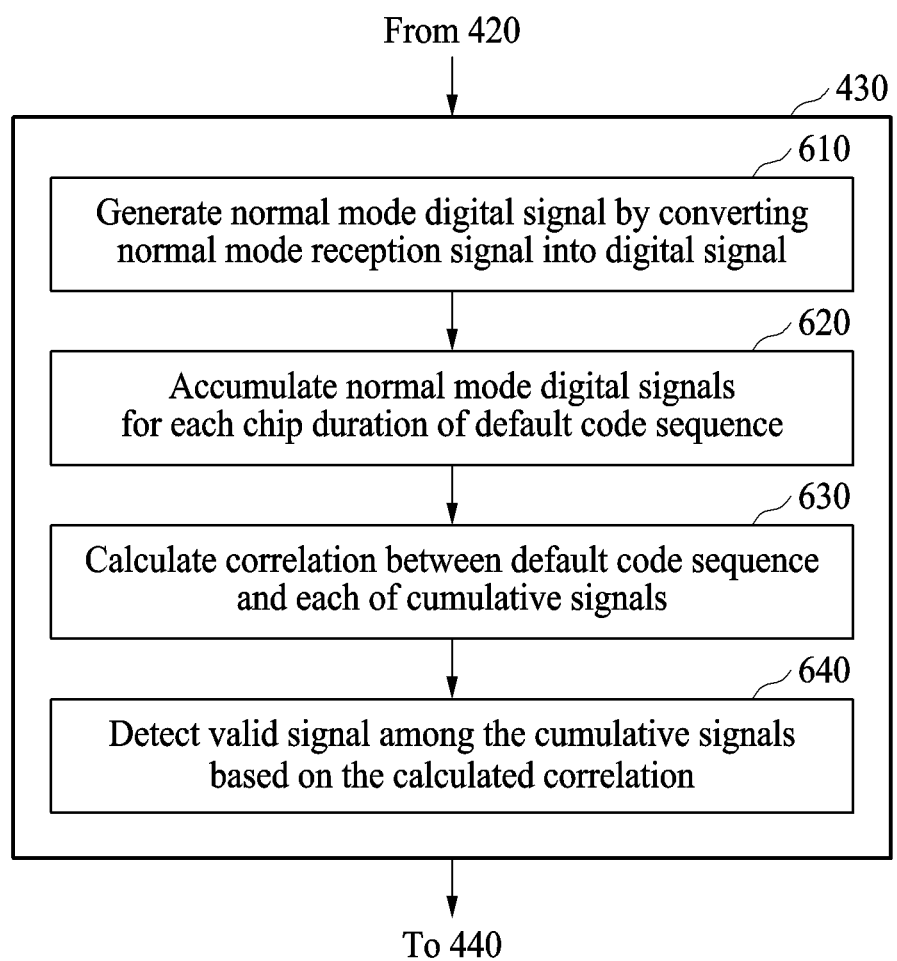
FIG. 6 is a flowchart illustrating an example of detecting an object.

FIG. 6 illustrates an example of detecting an object.

Referring to FIG. 6, operation 430 of FIG. 4 includes operations 610, 620, 630 and 640.

In operation 610, the processor 320 generates a normal mode digital signal by converting the normal mode reception signal into a digital signal. The processor 320 generates the normal mode digital signal based on a waveform of the normal mode reception signal. For example, codes corresponding to waveforms of normal mode reception signals received for each chip duration are determined, and the normal mode digital signal is generated based on the codes. The normal mode digital signal will be further described below with reference to FIG. 7.

In operation 620, the processor 320 accumulates normal mode digital signals for each chip duration of the default code sequence. The processor 320 generates cumulative signals by accumulating normal mode digital signals for each chip duration, using accumulators. For example, a first accumulator generates a first cumulative signal by accumulating signals during a period of "m×$T_{chip}$" from a first point in time at which a normal mode transmission signal is propagated. Also, a second accumulator generates a second cumulative signal by accumulating signals during a period of "m×$T_{chip}$" from a second point in time after one chip duration has elapsed from the first point in time. The cumulative signals will be further described below with reference to FIG. 7.

In operation 630, the processor 320 calculates a correlation between the default code sequence and each of cumulative signals. For example, the processor 320 calculates a correlation between the first cumulative signal and the default code sequence, and calculates a correlation between the second cumulative signal and the default code sequence.

In operation 640, the processor 320 detects a valid signal among the cumulative signals based on the calculated correlation. In an example, the processor 320 detects, as a valid signal, a cumulative signal having a highest correlation among correlations calculated for the cumulative signals. In another example, the processor 320 detects, as a valid signal, a signal having a correlation that is greater than or equal to a preset threshold among correlations calculated for the cumulative signals. When a valid signal is not detected, an object is determined not to exist in the vicinity of the vehicle 100.

For example, the processor 320 acquires range-Doppler data by performing a fast Fourier transform (FFT) operation of a signal correlated between the default code sequence and the cumulative signals. A position having a maximum correlation value with the cumulative signals is determined based on the range-Doppler data, and a cumulative signal with the position is detected as a valid signal.

Operations subsequent to operation 640 in operation 430 will be described in detail below with reference to FIG. 8.

Figure 7:
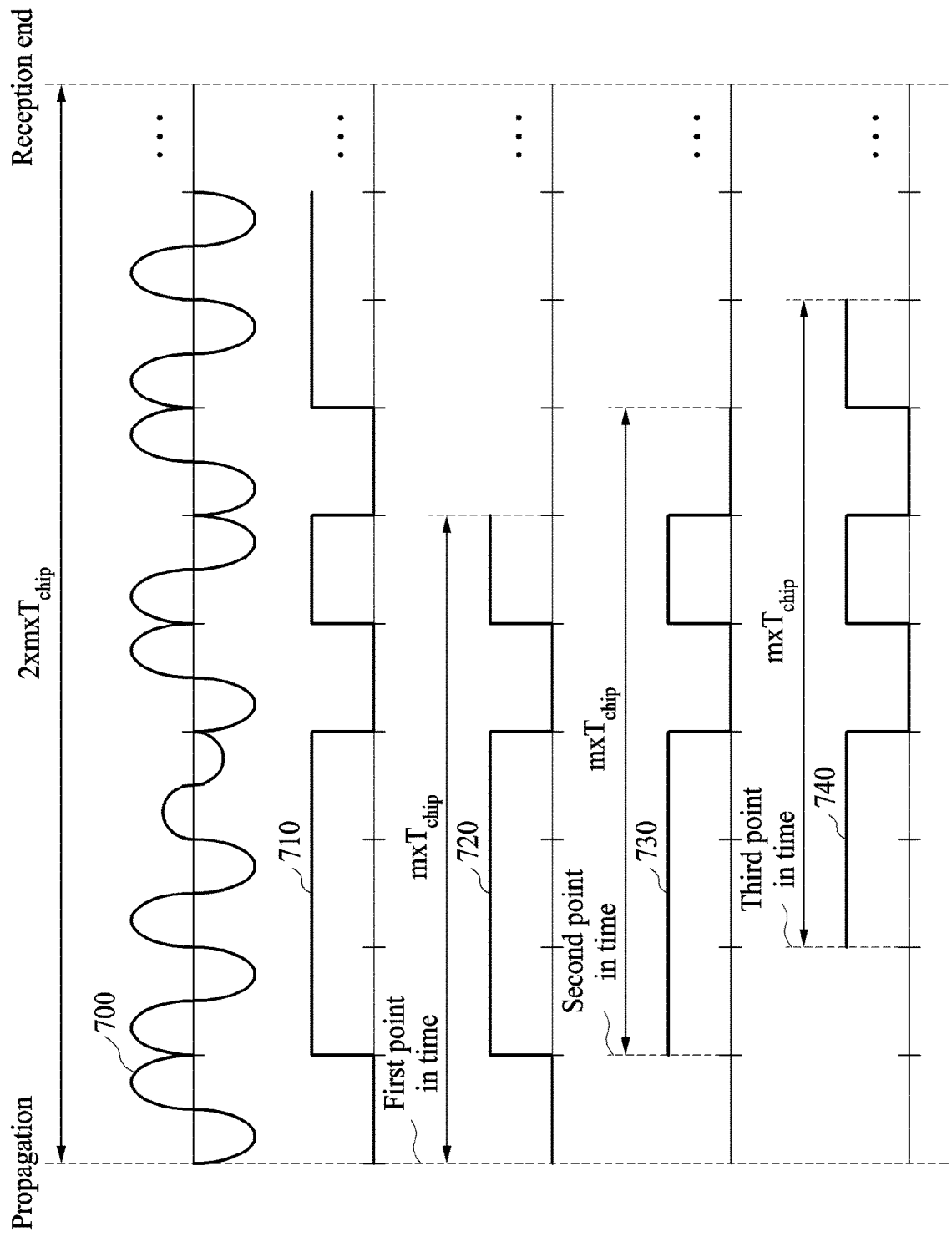
FIG. 7 is a diagram illustrating an example of generating cumulative signals for each chip duration.

FIG. 7 illustrates an example of generating cumulative signals for each chip duration.

For example, the normal mode period is set to "2×m×$T_{chip}$." In the normal mode period, a normal mode reception signal 700 is continuously received. The normal mode reception signal 700 includes noise, and a signal reflected from an object by transmitting a normal mode transmission signal to the object.

The processor 320 generates a normal mode digital signal 710 by converting the received normal mode reception signal 700 into a digital signal.

The processor 320 generates cumulative signals, for example, a first cumulative signal 720, a second cumulative signal 730 and a third cumulative signal 740, by accumulating normal mode digital signals 710 for each chip duration using accumulators. The first cumulative signal 720 is acquired for a period of "m×$T_{chip}$" from a first point in time, and the second cumulative signal 730 is acquired for a period of "m×$T_{chip}$" from a second point in time. Also, the third cumulative signal 740 is acquired for a period of "m×$T_{chip}$" from a third point in time.

The processor 320 calculates a correlation between the default code sequence 500 and each of the first cumulative signal 720 through the third cumulative signal 740. Based on the calculated correlation, a valid signal is detected among the first cumulative signal 720 through the third cumulative signal 740. For example, when a valid signal is not detected, an object is determined not to exist in the vicinity of the vehicle 100.

Figure 8:
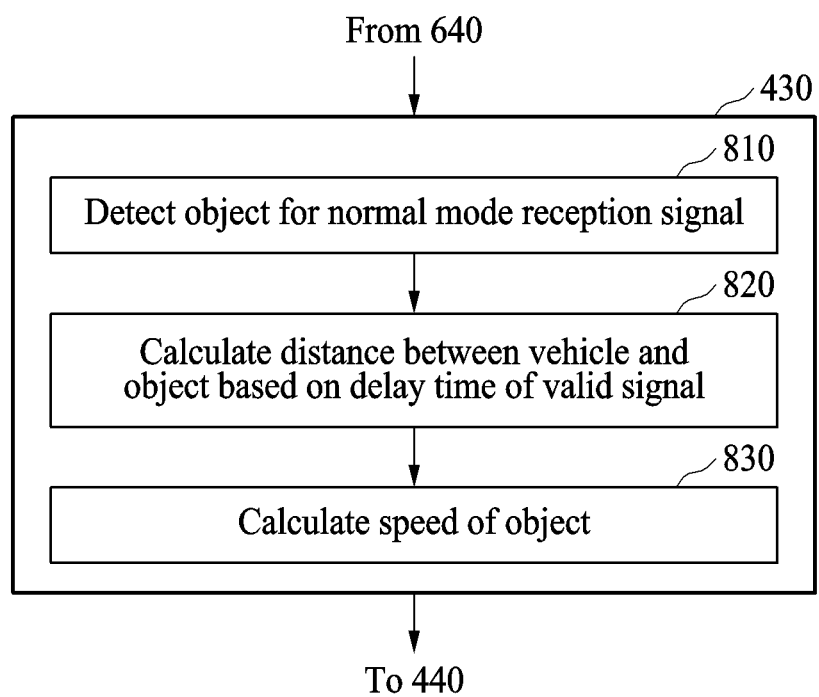
FIG. 8 is a flowchart illustrating another example of detecting an object.

FIG. 8 illustrates another example of detecting an object.

Referring to FIG. 8, operation 430 of FIG. 4 includes operations 810, 820 and 830. For example, operation 810 is performed after operation 640 of FIG. 6.

In operation 810, the processor 320 detects an object for the normal mode reception signal. For example, when a valid signal is detected among the cumulative signals, the processor 320 detects an object for the valid signal.

In operation 820, the processor 320 calculates a distance between the vehicle 100 and the object based on a delay time of the valid signal. For example, the processor 320 calculates the distance using Equation 1 shown below. In Equation 1, c is a speed of light, and $t_{delay}$ is the delay time of the valid signal. The delay time is an amount of time during which a reception of the valid signal is delayed from a point in time at which the normal mode transmitting signal is transmitted.

$$\text{Distance} = \frac{c \times t_{delay}}{2} \quad \text{[Equation 1]}$$

A normal mode period includes intervals, and a normal mode transmission signal is propagated once and an object is detected for each of the intervals. For example, when the normal mode period includes four intervals, an object is detected four times and a distance to the object is calculated four times. The intervals will be further described below with reference to FIG. 9.

In operation 830, the processor 320 calculates a speed of the object based on calculated distances to the object. The calculated speed is, for example, a relative speed.

Figure 9:
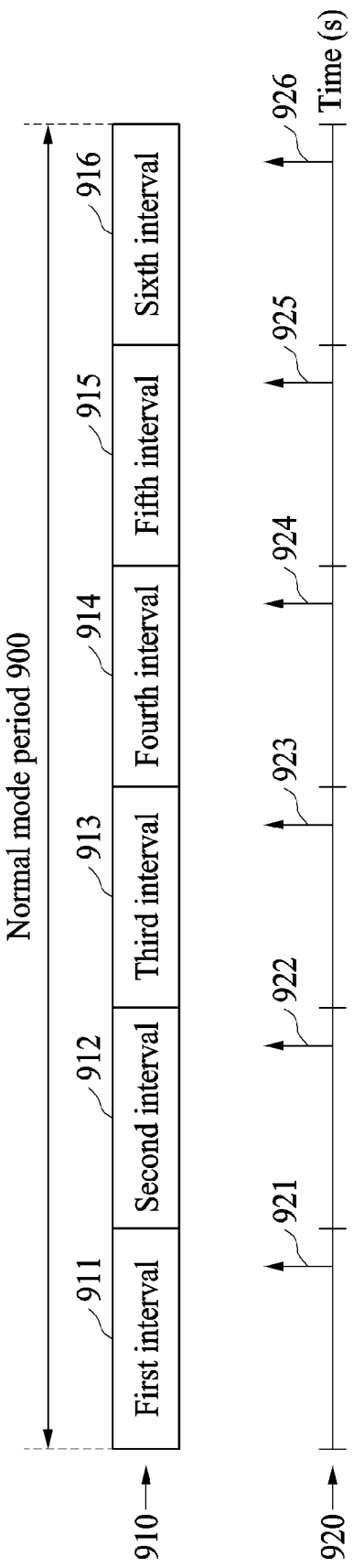
FIG. 9 is a diagram illustrating an example of a correlation acquired in each of intervals of a normal mode period.

FIG. 9 illustrates an example of a correlation acquired in each of intervals of a normal mode period 900.

Referring to FIG. 9, the normal mode period 900 includes intervals, for example, a first interval 911 through a sixth interval 916. The normal mode period 900 corresponds to times 910 and 920. In the first interval 911, a normal mode transmission signal is propagated and an object is detected. A first distance 921 to the object detected in the first interval 911 is calculated. In a second interval 912, a normal mode transmission signal is propagated and an object is detected. A second distance 922 to the object detected in the second interval 912 is calculated.

For example, a speed of an object is calculated based on the first distance 921 and the second distance 922. The speed of the object is calculated again based on a third distance 923.

Figure 10:
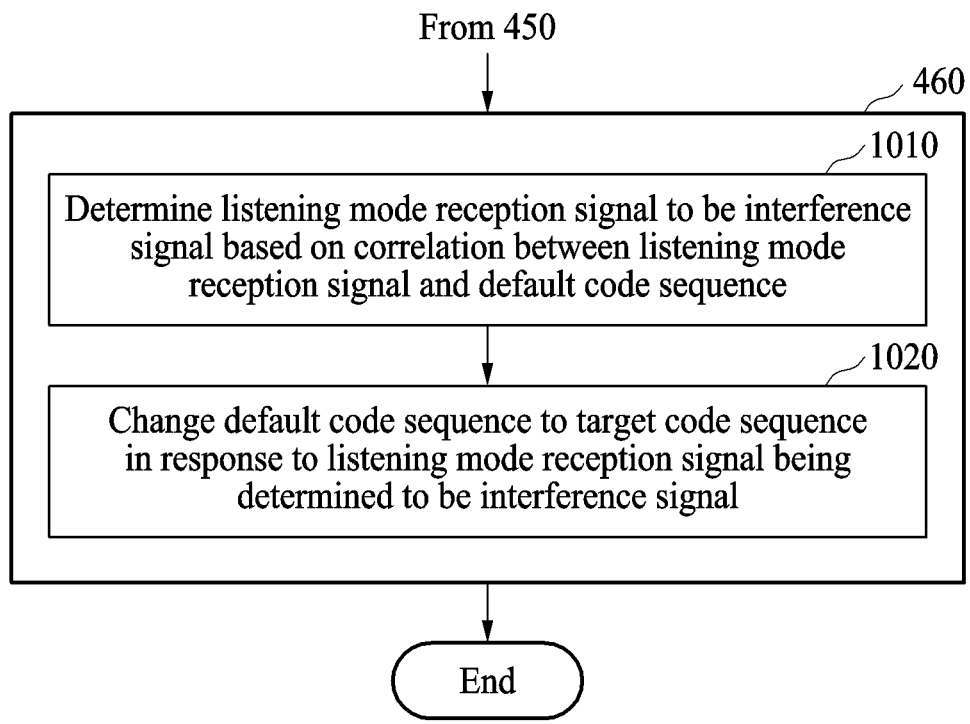
FIG. 10 is a flowchart illustrating an example of changing a default code sequence.

FIG. 10 illustrates an example of changing a default code sequence.

Referring to FIG. 10, operation 460 of FIG. 4 includes operations 1010 and 1020.

In operation 1010, the processor 320 determines the listening mode reception signal to be (e.g., detects) an interference signal based on the correlation between the listening mode reception signal and the default code sequence. A detection of an interference signal indicates that the same default code sequence as that of the vehicle 100 is used by another vehicle (for example, the vehicle 200 of FIG. 2).

The description of operation 1010 is replaced with the above description of operations 610 through 640 of FIG. 6 and operations 810 through 830 of FIG. 8. The description of the listening mode reception signal is replaced with the above description of the normal mode reception signal, and the description of the interference signal is replaced with the above description of the valid signal.

In operation 1020, the processor 320 changes the default code sequence to a target code sequence in response to the listening mode reception signal being determined to be the interference signal. Because the same default code sequence is used by both the vehicles 100 and 200, the default code sequence used by the vehicle 100 is changed to a target code sequence to prevent a signal propagated by the vehicle 200 from interfering with the vehicle 100.

An example of changing a default code sequence to a target code sequence will be further described below with reference to FIG. 11. The changed default code sequence is used in a next normal mode period.

Figure 11:
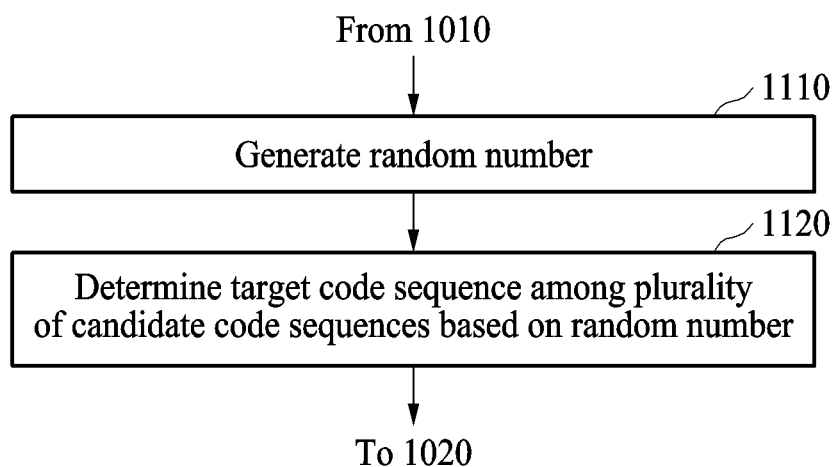
FIG. 11 is a flowchart illustrating an example of determining a target code sequence among a plurality of candidate code sequences.

FIG. 11 illustrates an example of determining a target code sequence among candidate code sequences.

Referring to FIG. 11, operation 460 of FIG. 10 further includes operations 1110 and 1120. When operation 1010 is completed, operation 1110 is performed.

In operation 1110, the processor 320 generates a random number.

In operation 1120, the processor 320 determines a target code sequence among candidate code sequences based on the random number. For example, a candidate code sequence is set in advance to correspond to each random number. The candidate code sequences are determined in advance based on either one or both of an autocorrelation and a cross-correlation. A previously used default code sequence is excluded from the candidate code sequences. The processor 320 changes the default code sequence to the determined target code sequence. In other words, the processor 320 sets the target code sequence as a default code sequence.

Figure 12:
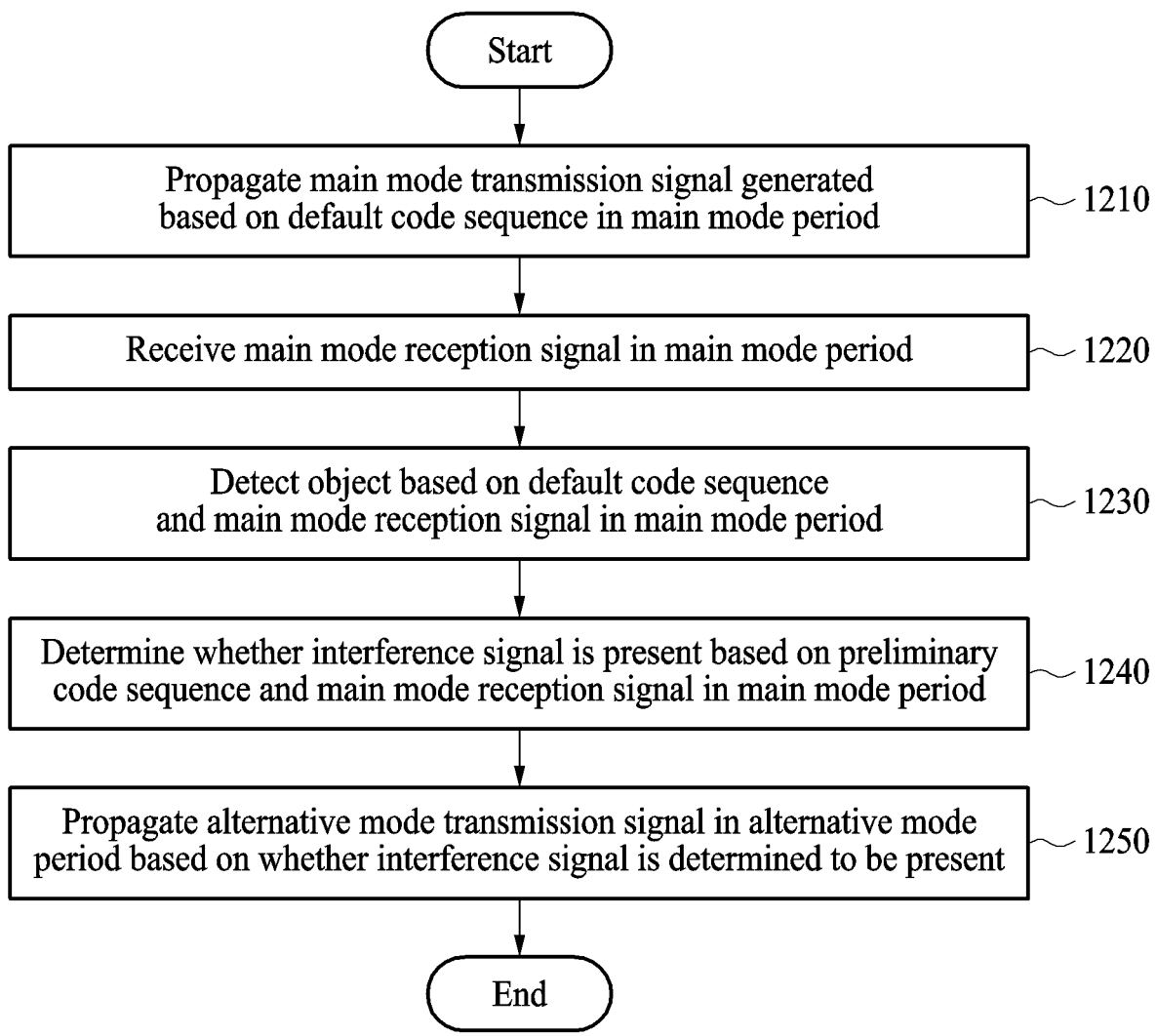
FIG. 12 is a flowchart illustrating another example of an object detection method.

FIG. 12 illustrates another example of an object detection method.

The object detection method of FIG. 12 is performed through operations 1210 through 1250. Operations 1210 through 1250 are performed by the object detection apparatus 300 described above with reference to FIGS. 3 through 11.

Referring to FIG. 12, in operation 1210, the communicator 310 propagates a main mode transmission signal generated based on a default code sequence in a main mode period. Further description of operation 1210 is replaced with above description of operation 410 of FIGS. 4 and 5.

In operation 1220, the communicator 310 receives a main mode reception signal in the main mode period. Further description of operation 1220 is replaced with the above description of operation 420 of FIG. 4.

In operation 1230, the processor 320 detects an object based on the default code sequence and the main mode reception signal in the main mode period. Further description of operation 1230 is replaced with the above description of operation 430 of FIGS. 4 and 6 to 9.

In operation 1240, the processor 320 determines whether an interference signal is present based on a preliminary code sequence and the main mode reception signal in the main mode period. The preliminary code sequence is a code sequence that is set in advance to be used in an alternative mode period that is a period next to the main mode period.

The above description of operation 460 of FIGS. 4 and 10 is similarly applicable to operation 1240. For example, operation 1240 is performed to determine whether an interference signal for a code sequence that is not used for a signal propagation is present. When the main mode reception signal received in the main mode period includes a signal propagated based on the same code sequence as the preliminary code sequence, a vehicle (for example, the vehicle 200 of FIG. 2) that detects an object based on the preliminary code sequence is determined to be in the vicinity of the vehicle 100. When an interference signal for the preliminary code sequence is detected based on the main mode reception signal, the preliminary code sequence is not used, to avoid an interference by the vehicle 200.

In operation 1250, the processor 320 propagates an alternative mode transmission signal in the alternative mode period based on whether the interference signal is detected. In an example, when the interference signal is not detected (e.g., not determined to be present) in operation 1240, the processor 320 propagates an alternative mode transmission signal generated based on the preliminary code sequence. In another example, when the interference signal is detected (e.g., determined to be present) in operation 1240, the processor 320 changes the preliminary code sequence, and propagates an alternative mode transmission signal generated based on the changed preliminary code sequence. An example of propagating an alternative mode transmission signal will be further described below with reference to FIG. 13.

Figure 13:
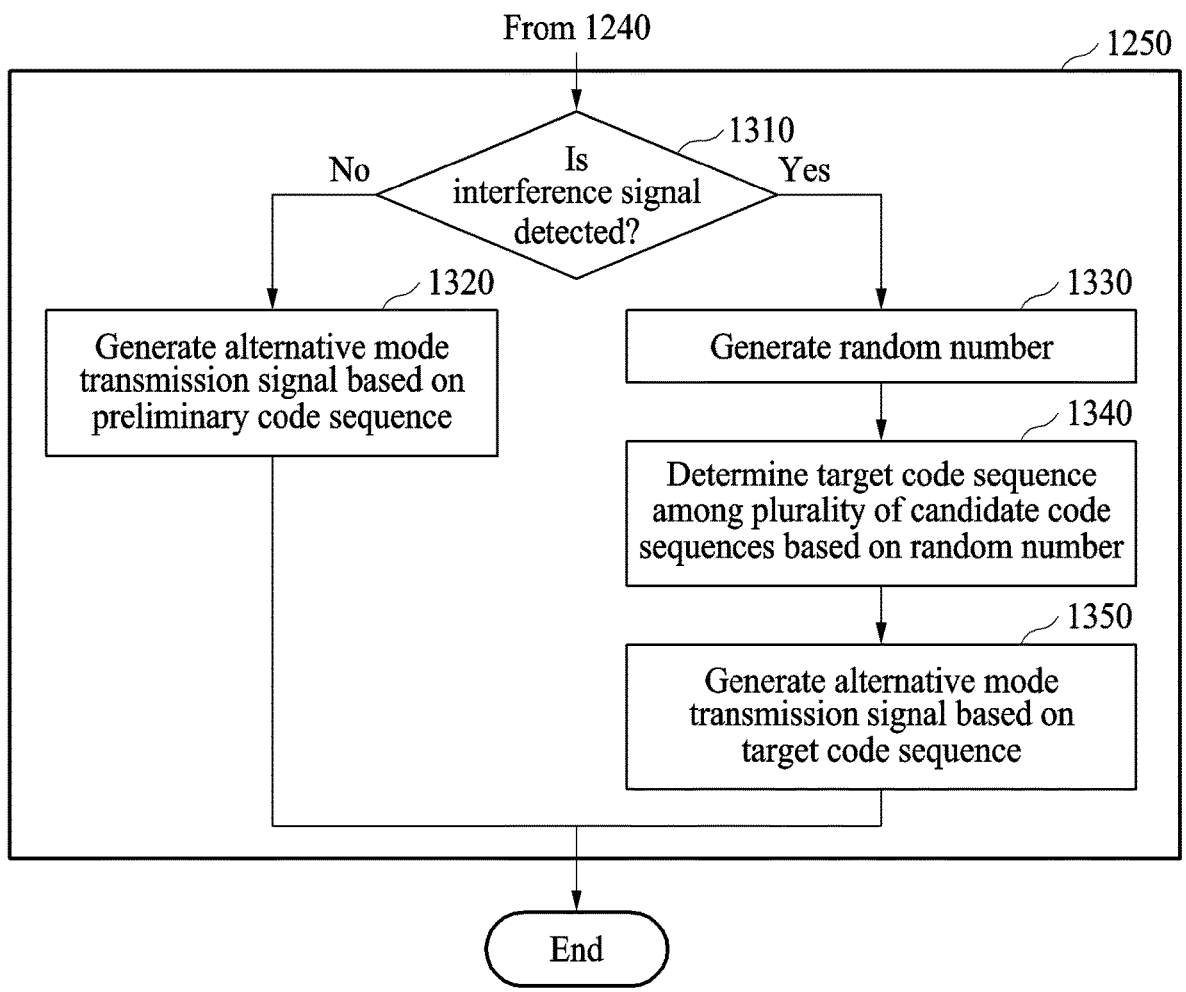
FIG. 13 is a flowchart illustrating an example of generating an alternative mode transmission signal.

FIG. 13 illustrates an example of generating an alternative mode transmission signal.

Referring to FIG. 13, operation 1250 of FIG. 12 includes operations 1310 through 1350.

In operation 1310, the processor 320 determines whether an interference signal for a preset preliminary code sequence is detected (e.g. determined to be present).

When the interference signal is not detected in operation 1310, the processor 320 generates an alternative mode transmission signal based on the preliminary code sequence in operation 1320.

When the interference signal is detected in operation 1310, the processor 320 generates a random number in operation 1330.

In operation 1340, the processor 320 determines a target code sequence among candidate code sequences based on the random number. For example, a candidate code sequence is set in advance to correspond to each random number. The candidate code sequences are determined in advance based on either one or both of an autocorrelation and a cross-correlation. A previously used code sequence of default code sequence is excluded from the candidate code sequences. The processor 320 changes the preliminary code sequence to the determined target code sequence. In other words, the processor 320 sets the target code sequence as a preliminary code sequence.

In operation 1350, the processor 320 generates an alternative mode transmission signal based on the target code sequence.

Figure 14:
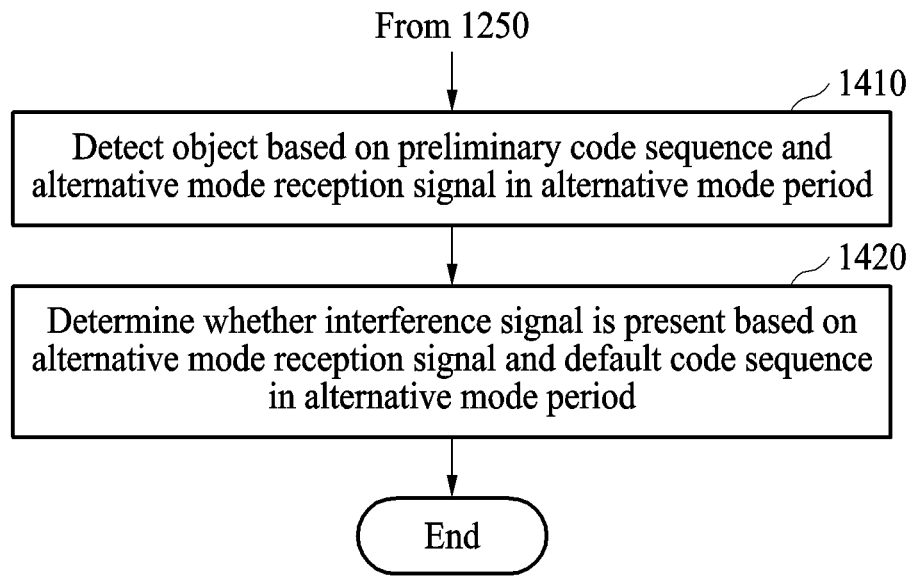
FIG. 14 is a flowchart illustrating an example of detecting an object and an interference signal in an alternative mode period.

FIG. 14 illustrates an example of detecting an object and an interference signal in an alternative mode period.

When operation 1250 of FIG. 12 is completed, operations similar to operations 1220, 1230 and 1240 of FIG. 12 performed in the main mode period are performed in the alternative mode period. For example, the communicator 310 receives an alternative mode reception signal in the alternative mode period. In operation 1410, the processor 320 detects an object based on a preliminary code sequence and the alternative mode reception signal in the alternative mode period. In operation 1420, the processor 320 determines whether an interference signal for a default code sequence is present based on the alternative mode reception signal and the default code sequence in the alternative mode period. The default code sequence is a code sequence that is not used to generate a propagation signal in the alternative mode period.

Figure 15:
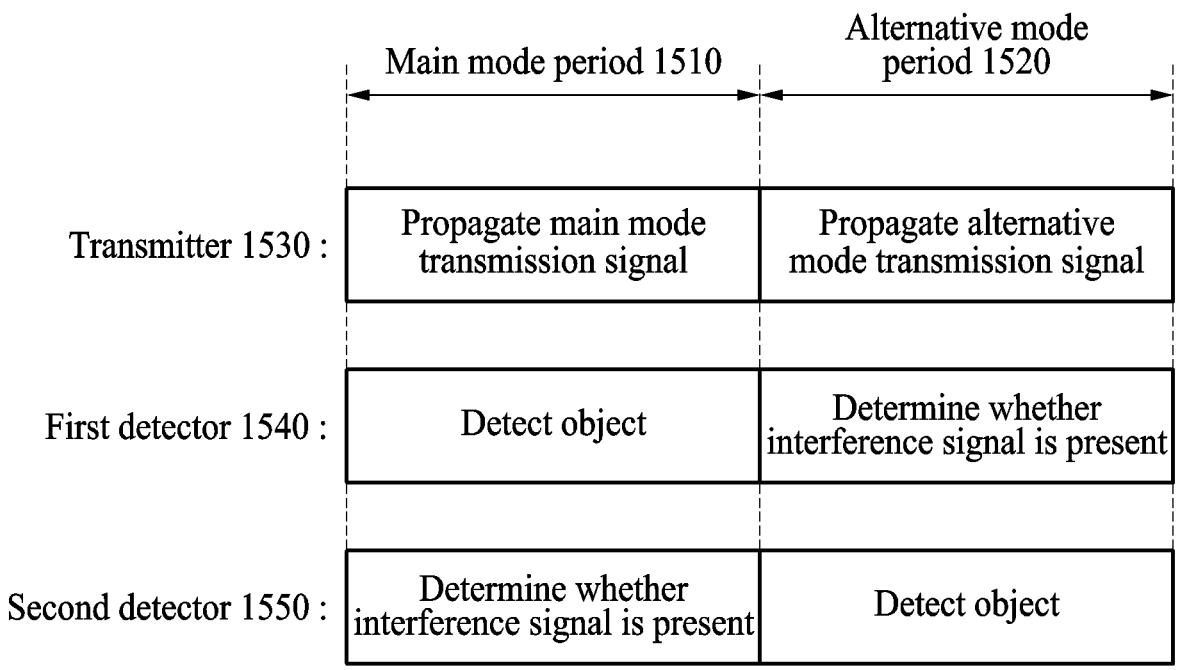
FIG. 15 is a diagram illustrating an example of a method of detecting an object using a transmitter and detectors in a vehicle.

FIG. 15 illustrates an example of a method of detecting an object using a transmitter and detectors in a vehicle.

For example, the communicator 310 of FIG. 3 includes a transmitter 1530, and the processor 320 of FIG. 3 includes a first detector 1540 and a second detector 1550.

In a main mode period 1510, the transmitter 1530 propagates a main mode transmission signal, a first detector 1540 detects an object based on a main mode reception signal and a default code sequence, and the second detector 1550 determines whether an interference signal is present for a preliminary code sequence based on the main mode reception signal and the preliminary code sequence. When the interference signal for the preliminary code sequence is determined to be present, the preliminary code sequence is changed to a first target code sequence. The first target code sequence is one of candidate code sequences and is determined based on a generated random number.

In an alternative mode period 1520, the transmitter 1530 propagates an alternative mode transmission signal, the first detector 1540 determines whether an interference signal for a default code sequence is present based on an alternative mode reception signal and the default code sequence, and the second detector 1550 detects an object based on the alternative mode reception signal and a preliminary code sequence. When the interference signal for the default code sequence is determined to be present, the default code sequence is changed to a second target code sequence. The second target code sequence is one of the candidate code sequences and is determined based on a generated random number.

The communicator 310, the processor 320, and the memory 330 in FIG. 3, and the transmitter 1530, the first detector 1540, and the second detector 1550 in FIG. 15 that perform the operations described in this application are implemented by hardware components configured to perform the operations described in this application that are performed by the hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 4, 6, 8, and 10 to 14 that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control a processor or computer to implement the hardware components and perform the methods as described above are written as computer programs, code segments, instructions or any combination thereof, for individually or collectively instructing or configuring the processor or computer to operate as a machine or special-purpose computer to perform the operations performed by the hardware components and the methods as described above. In one example, the instructions or software include machine code that is directly executed by the processor or computer, such as machine code produced by a compiler. In another example, the instructions or software include higher-level code that is executed by the processor or computer using an interpreter. Programmers of ordinary skill in the art can readily write the instructions or software using any programming language based on the block diagrams and the flow charts illustrated in the drawings and the corresponding descriptions in the specification, which disclose algorithms for performing the operations performed by the hardware components and the methods as described above.

The instructions or software to control a processor or computer to implement the hardware components and perform the methods as described above, and any associated data, data files, and data structures, are recorded, stored, or fixed in or on one or more non-transitory computer-readable storage media. Examples of a non-transitory computer-readable storage medium include read-only memory (ROM), random-access programmable read only memory (PROM), electrically erasable programmable read-only memory (EEPROM), random-access memory (RAM), dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and providing the instructions or software and any associated data, data files, and data structures to a processor or computer so that the processor or computer can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A method performed by an apparatus included in a vehicle to detect an object using a radar, the method comprising:
    propagating, in a normal mode period of an operating period for detecting objects, a normal mode transmission signal generated based on a default code sequence comprising at least two codes;
    receiving a normal mode reception signal in the normal mode period;
    detecting, in the normal mode period, an object based on the default code sequence and the normal mode reception signal;
    receiving a listening mode reception signal in a listening mode period of the operating period;
    acquiring a correlation between the listening mode reception signal and the default code sequence, the acquired correlation being indicative of whether the listening mode reception signal is an interference signal; and
    changing the default code sequence based on the correlation.

2. The method of claim 1, wherein the normal mode transmission signal comprises a phase modulated continuous wave (PMCW) signal.

3. The method of claim 2, wherein the default code sequence is determined in advance based on either one or both of an autocorrelation and a cross-correlation.

4. The method of claim 1, wherein the detecting of the object comprises generating a normal mode digital signal by converting the normal mode reception signal into a digital signal.

5. The method of claim 4, wherein the detecting of the object further comprises
    generating cumulative signals by accumulating the normal mode digital signal for each of chip durations of the default code sequence, and
    detecting the object based on a respective correlation between the default code sequence and each of the cumulative signals.

6. The method of claim 5, wherein the detecting of the object based on the respective correlation between the default code sequence and each of the cumulative signals comprises
    calculating the respective correlation between the default code sequence and each of the cumulative signals, and
    detecting the object by detecting a valid signal among the cumulative signals based on the calculated respective correlation.

7. The method of claim 6, wherein the detecting of the object based on the respective correlation between the default code sequence and each of the cumulative signals further comprises calculating a distance between the vehicle and the object based on a delay time of the valid signal.

8. The method of claim 6, wherein the detecting of the object based on the respective correlation between the default code sequence and each of the cumulative signals further comprises calculating a speed of the object based on distances between the vehicle and the object calculated for intervals in the normal mode period.

9. The method of claim 1, wherein the changing of the default code sequence comprises
    determining the listening mode reception signal to be an interference signal based on a correlation between the default code sequence and the listening mode reception signal, and
    changing the default code sequence in response to the listening mode reception signal being determined to be the interference signal.

10. The method of claim 9, wherein
the changing of the default code sequence further comprises
generating a random number, and
determining a target code sequence among candidate code sequences based on the random number, and
the changing of the default code sequence in response to the listening mode reception signal being determined to be the interference signal comprises setting the target code sequence as the default code sequence.

11. A non-transitory computer-readable storage medium storing instructions that, when executed by a processor, cause the processor to perform the method of claim 1.

12. A method performed by an apparatus included in a vehicle to detect an object using a radar, the method comprising:
    propagating, in a normal mode period of an operating period for detecting objects, a normal mode transmission signal generated based on a default code sequence comprising at least two codes;
    receiving a normal mode reception signal in the normal mode period;
    detecting, in the normal mode period, an object based on the default code sequence and the normal mode reception signal;
    receiving a listening mode reception signal in a listening mode period of the operating period;
    acquiring a correlation between the listening mode reception signal and the default code sequence; and
    changing the default code sequence based on the correlation,
    wherein the detecting of the object comprises generating a normal mode digital signal by converting the normal mode reception signal into a digital signal, and
    wherein the detecting of the object further comprises
    generating cumulative signals by accumulating the normal mode digital signal for each of chip durations of the default code sequence, and
    detecting the object based on a correlation between the default code sequence and each of the cumulative signals.

13. The method of claim 12, wherein the detecting of the object based on the correlation between the default code sequence and each of the cumulative signals comprises
    calculating the correlation between the default code sequence and each of the cumulative signals, and
    detecting the object by detecting a valid signal among the cumulative signals based on the calculated correlation.

14. The method of claim 13, wherein the detecting of the object based on the correlation between the default code sequence and each of the cumulative signals further comprises calculating a distance between the vehicle and the object based on a delay time of the valid signal.

15. The method of claim 13, wherein the detecting of the object based on the correlation between the default code sequence and each of the cumulative signals further comprises calculating a speed of the object based on distances between the vehicle and the object calculated for intervals in the normal mode period.

16. An apparatus to detect an object using a radar, the apparatus comprising:
    a processor configured to execute a program to
    propagate, in a normal mode period of an operating period for detecting objects, a normal mode transmission signal generated based on a default code sequence comprising at least two codes,
    receive a normal mode reception signal in the normal mode period,
    detect, in the normal mode period, an object based on the default code sequence and the normal mode reception signal,
    receive a listening mode reception signal in a listening mode period of the operating period,
    acquire a correlation between the listening mode reception signal and the default code sequence, the acquired correlation being indicative of whether the listening mode reception signal is an interference signal, and
    change the default code sequence based on the correlation.

17. The apparatus of claim 16, further comprising a memory configured to store the instructions.

18. The apparatus of claim 16, wherein the apparatus is installed in a vehicle.

19. The apparatus of claim 18, wherein the vehicle is any one of an autonomous vehicle, an automobile, an electric vehicle, a truck, a motorcycle, a boat, a public transit vehicle, a bus, a monorail, a train, and an unmanned aerial vehicle.

* * * * *